Nov. 17, 1964     F. A. KYLE ETAL     3,157,274
METHOD OF CONTROLLING RESIDUAL STRESSES
IN MATERIALS DURING WORKING
Filed Oct. 10, 1960     9 Sheets-Sheet 1

INVENTOR.
THOMAS A. KELLY, MAURICE N. LANDIS
FRANK A. KYLE, ELLIOT S. NACHTMAN

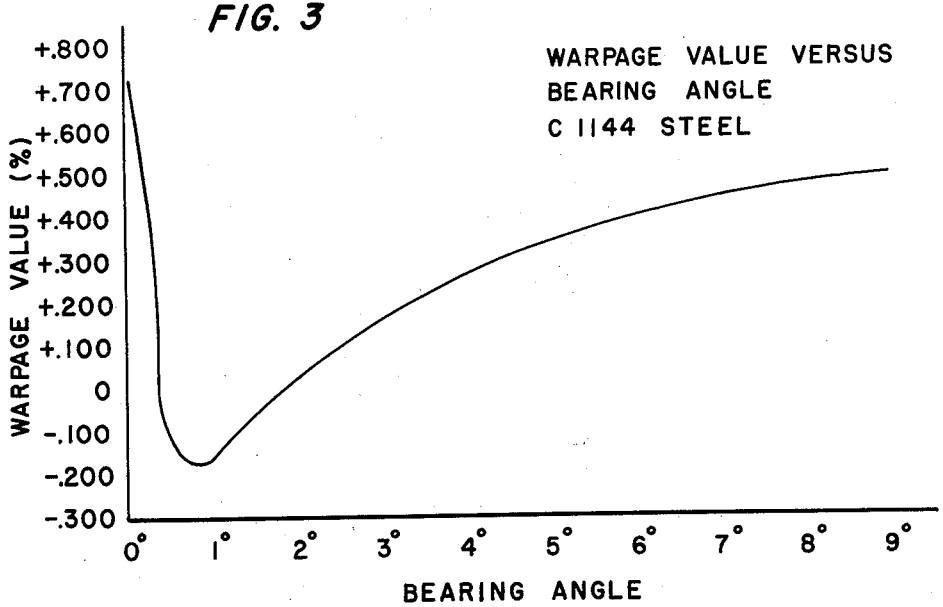
FIG. 3 WARPAGE VALUE VERSUS BEARING ANGLE C 1144 STEEL
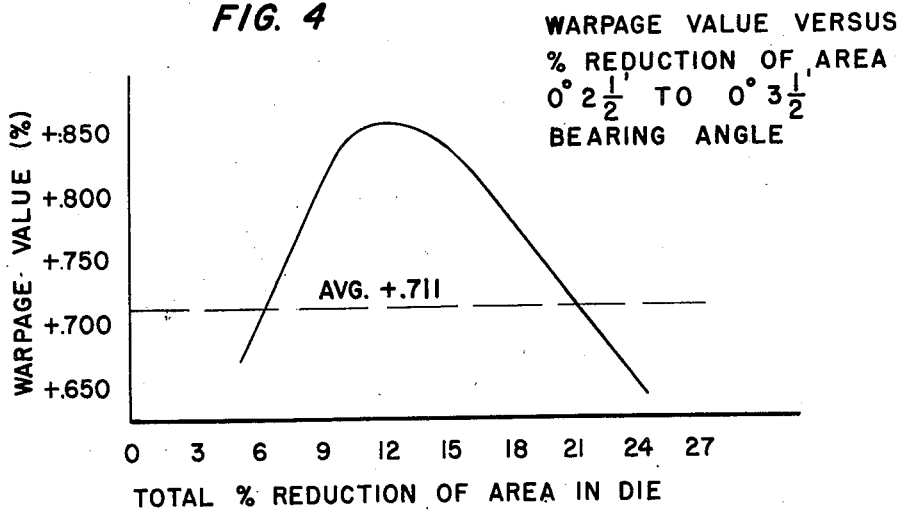
FIG. 4 WARPAGE VALUE VERSUS % REDUCTION OF AREA $0°2\frac{1}{2}'$ TO $0°3\frac{1}{2}'$ BEARING ANGLE

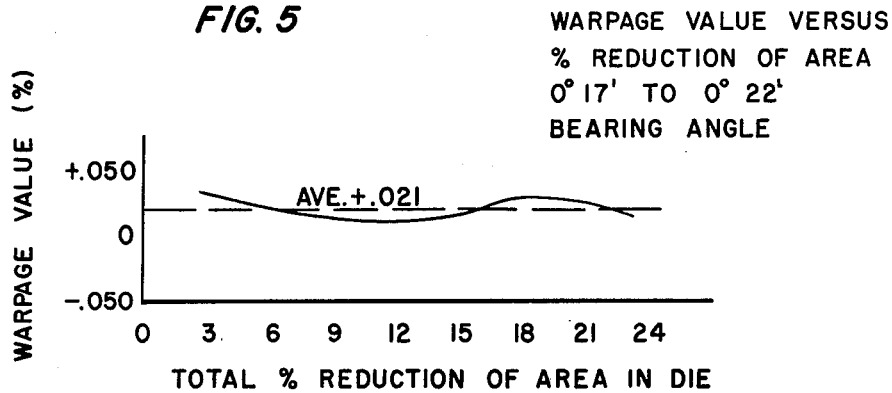
FIG. 5 — WARPAGE VALUE VERSUS % REDUCTION OF AREA 0° 17' TO 0° 22' BEARING ANGLE
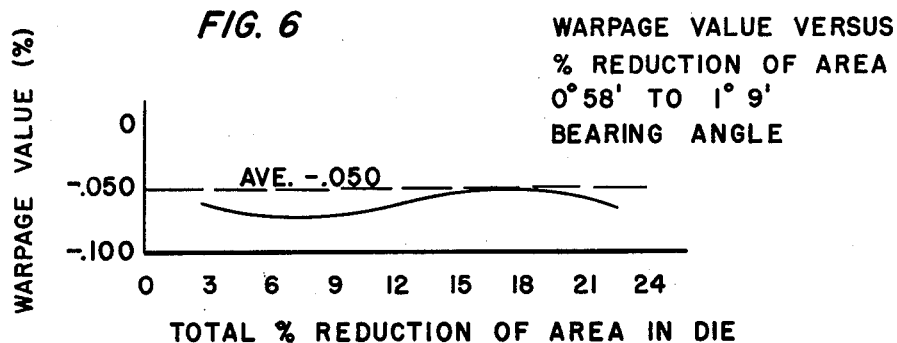
FIG. 6 — WARPAGE VALUE VERSUS % REDUCTION OF AREA 0° 58' TO 1° 9' BEARING ANGLE
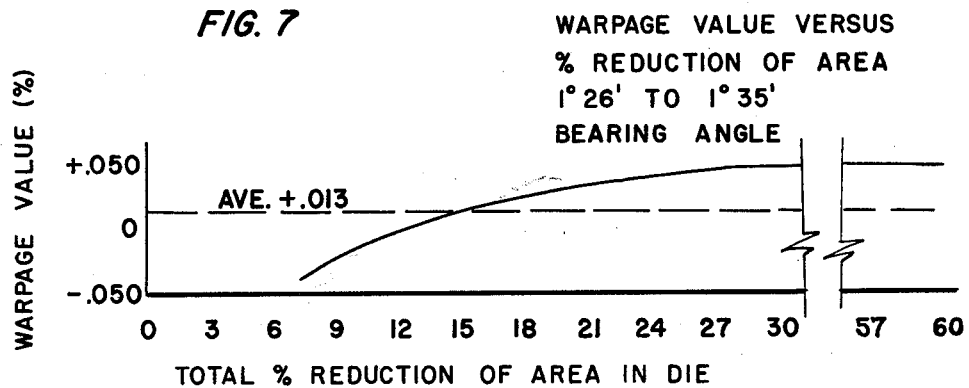
FIG. 7 — WARPAGE VALUE VERSUS % REDUCTION OF AREA 1° 26' TO 1° 35' BEARING ANGLE
INVENTOR.
THOMAS A. KELLY, MAURICE N. LANDIS,
FRANK A. KYLE, ELLIOT S. NACHTMAN

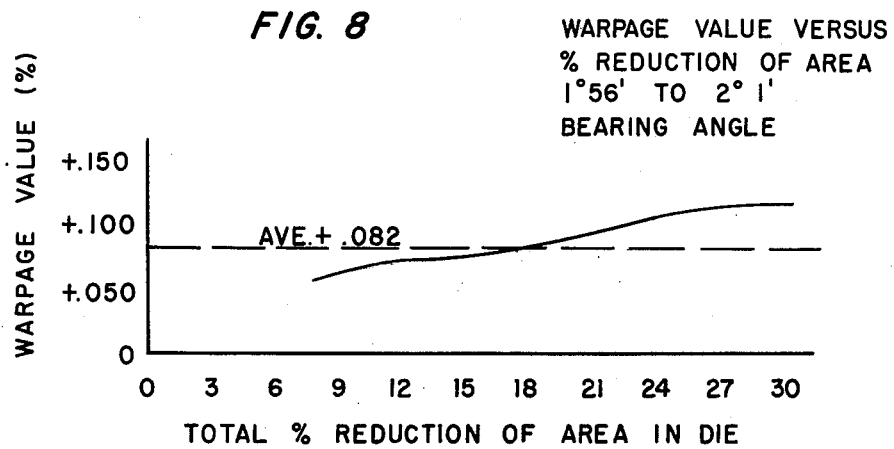
FIG. 8 — WARPAGE VALUE VERSUS % REDUCTION OF AREA 1°56' TO 2°1' BEARING ANGLE
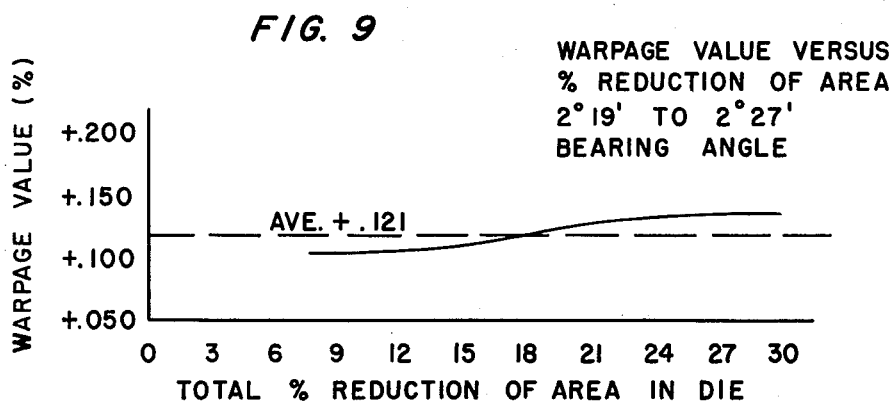
FIG. 9 — WARPAGE VALUE VERSUS % REDUCTION OF AREA 2°19' TO 2°27' BEARING ANGLE
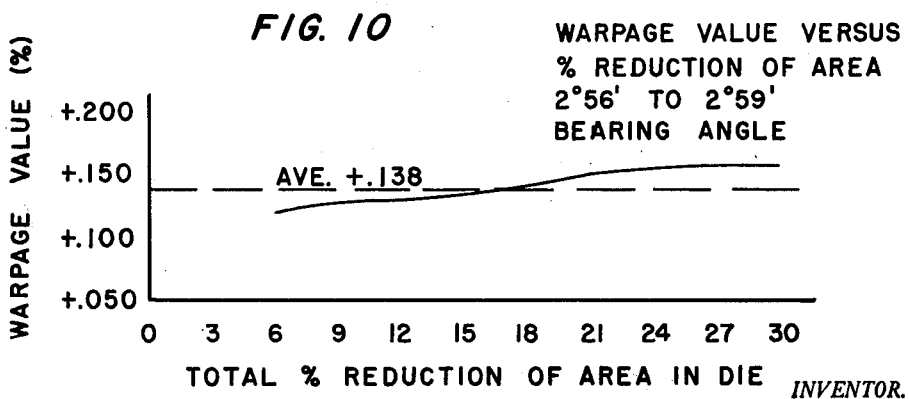
FIG. 10 — WARPAGE VALUE VERSUS % REDUCTION OF AREA 2°56' TO 2°59' BEARING ANGLE
INVENTOR.
THOMAS A. KELLY, MAURICE N. LANDIS
FRANK A. KYLE, ELLIOT S. NACHTMAN

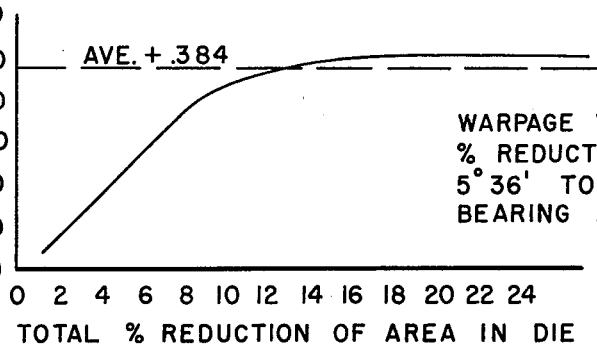
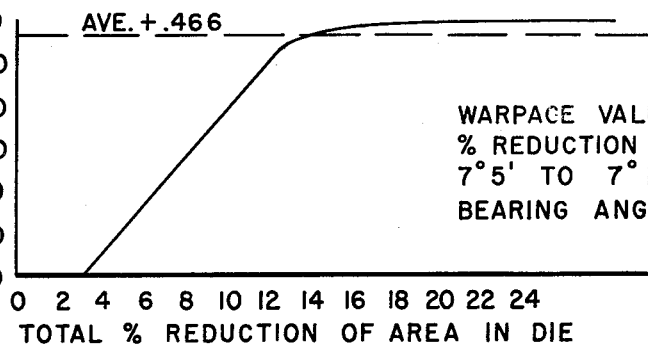
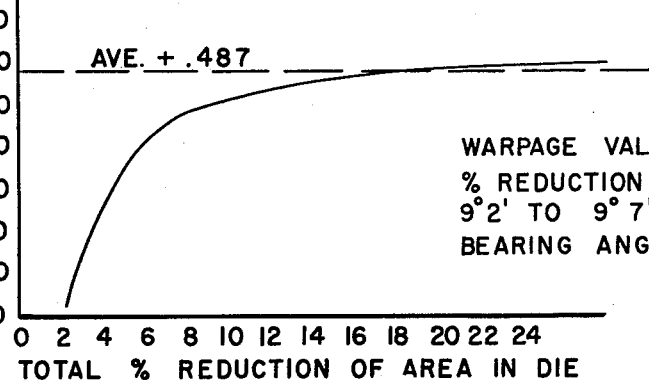
INVENTOR.
THOMAS A. KELLY, MAURICE N. LANDIS
FRANK A. KYLE, ELLIOT S. NATCHMAN Nov. 17, 1964   F. A. KYLE ETAL   3,157,274
METHOD OF CONTROLLING RESIDUAL STRESSES
IN MATERIALS DURING WORKING
Filed Oct. 10, 1960   9 Sheets-Sheet 8

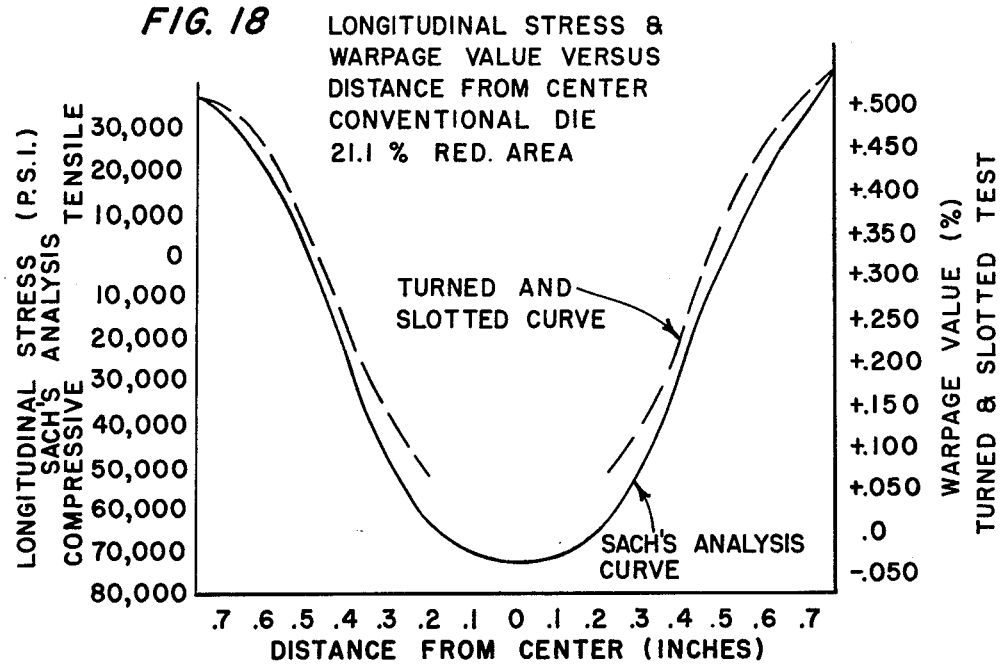

FIG. 18 LONGITUDINAL STRESS & WARPAGE VALUE VERSUS DISTANCE FROM CENTER CONVENTIONAL DIE 21.1 % RED. AREA

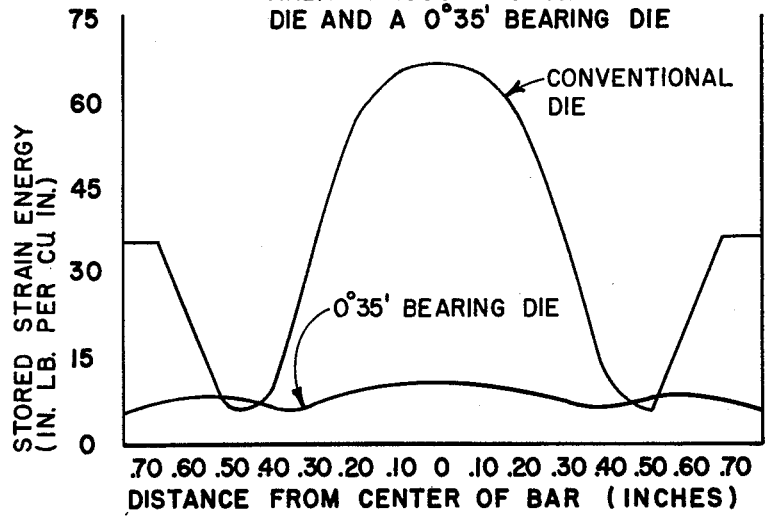

FIG. 19 DISTRIBUTION OF STORED STRAIN ENERGY DUE TO 21.1 % RED. OF AREA THROUGH CONVENTIONAL DIE AND A 0°35' BEARING DIE

INVENTOR.
THOMAS A. KELLY, MAURICE N. LANDIS,
FRANK A. KYLE, ELLIOT S. NACHTMAN
BY

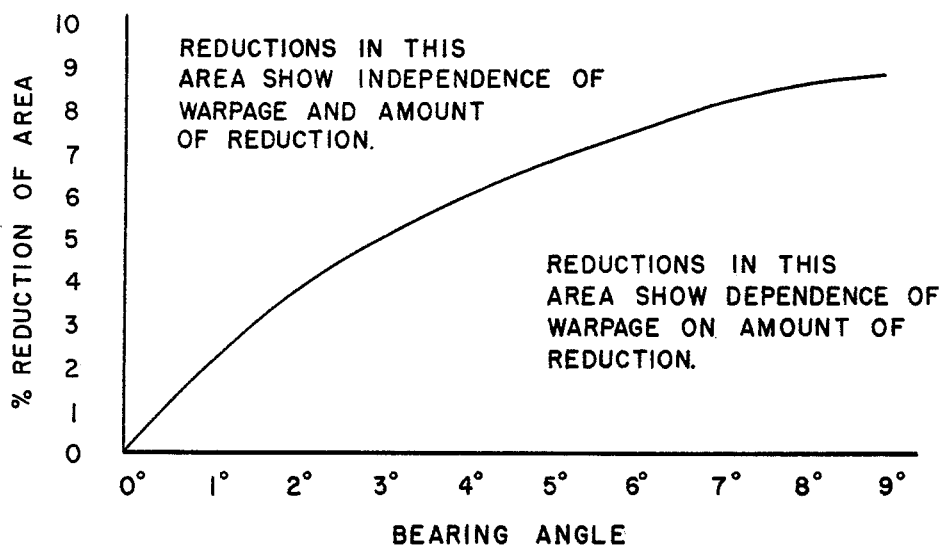

United States Patent Office 3,157,274
Patented Nov. 17, 1964

3,157,274
METHOD OF CONTROLLING RESIDUAL STRESSES IN MATERIALS DURING WORKING
Frank A. Kyle, Crown Point, Ind., and Maurice N. Landis and Thomas A. Kelly, Chicago, and Elliot S. Nachtman, Oak Park, Ill., assignors to La Salle Steel Company, Hammond, Ind., a corporation of Delaware
Filed Oct. 10, 1960, Ser. No. 62,073
4 Claims. (Cl. 205—26)

This invention relates to the improvement in the methods and apparatus for working materials which ordinarily exhibit the characteristics of hardening, as by strain hardening, in response to plastic deformation and it relates more particularly to the field of metallurgy wherein the physical properties of a metal, such as steel, are controlled by the conditions employed for working the metal during plastic deformation to produce steels and other metals having improved physical properties.

This application is a continuation-in-part of application Ser. No. 484,726, filed on January 28, 1955, now abandoned, entitled "Method of Controlling Residual Stresses in Materials During Working."

The inventive concepts will hereinafter be illustrated with reference to the processing of steel by plastic deformation brought about in an operation of drawing the steel in the form of a rod, bar, tube, or the like, through a draw die to effect change in cross-sectional area. It will be understood that the inventive concepts are applicable also to the processing of other materials not equivalent to steel, such as aluminum alloys, iron base alloys, copper base alloys, titanium base alloys, special high temperature alloys, special glasses and plastics and the like materials which ordinarily exhibit the phenomenon of strain hardening upon plastic deformation and that the invention is applicable also to plastic deformation of such materials brought about by other means for working steel and the like, such as by cold rolling, extrusion, tube drawing and the like.

From the standpoint of commercial practice, a material of the type described is subjected to plastic deformation, as by drawing the material through a die, for one or more of the following reasons: (1) dimensional tolerance, (2) improved surface finish, (3) improved machinability, (4) improved resistance to wear, and (5) improved mechanical properties. In the course of the development of these characteristics by plastic deformation, it has been observed that a number of changes normally occur in the lattice structure of the steel or other material. During plastic deformation, the registry between the adjacent planes of atoms is disturbed. This mismatching produces a strained condition between adjacent planes of atoms, resulting in the formation of dislocations. Because of these strains introduced between atoms and similarly between crystals during plastic deformation, the entire structure becomes excited. Such excitation results in a marked increase in the stored strain energy in the material. This disturbance, both on the atomic and on the crystal level, also results in the further development of internal elastic stresses, generally referred to as residual stresses.

To the present, various techniques have been devised for modifying the stored strain energy and the residual stresses which occur in strain hardened material. Modification of the residual stresses in deformed or strain hardened steels can usually be achieved by an appropriate thermal treatment. These treatments generally require heating the material to a temperature above the recrystallization temperature for the steel composition wherein readjustment of the crystal structure is possible to relax the residual stresses. Such heat treatment to relieve stresses are generally referred to in the metallurgical art as annealing, patenting, stress relieving and normalizing, etc.

The residual stresses may also be modified in steel and in other metals by appropriate mechanical processes. For example, shot peening has been used extensively to modify the existing residual stress pattern and to introduce some compressive stresses in the peened surface.

These various thermal and mechanical systems also require additional equipment, special fixtures, additional time and labor and thus increase the cost of the final product.

It is an object of this invention to provide a method and apparatus for controlling the stored strain energy and the residual stress levels introduced into materials which tend to strain harden in response to plastic deformation and it is a related object to provide a method and apparatus of the type described by which the residual stresses and stored strain energy in steels and the like materials are modified to a desired uniformity and to a desired level in a practical and in an economical manner.

Another object is to provide a method and apparatus of the type described by which the residual stresses in steel and the like materials subject to strain hardening are reduced to a low level as an incidence with the working of the steel for effecting a reduction in cross-sectional area.

More specifically, it is an object of this invention to provide a method and apparatus for selectively producing steels having compressive stresses in the surface portions thereof, low levels of tensile stresses, selected values of compressive or tensile stresses, in steels in which such stresses are fairly uniform throughout the cross-sectional area thereof thereby to produce steels having new and improved characteristics and it is a related object to effect these controls in stress distribution and intensity by the process of working the steel as by drawing the steel through a draw die but in which such controls may also be effected by the processes of working steel by rolling, swaging, spinning or the like.

A still further object is to provide a means for controlling the intensity and/or the distribution and/or the sign of residual stresses and stored strain energy in steel by means of working the steel, as in a drawing operation.

A still further object of this invention is to produce steels having compressive stresses in the surface portions thereof as distinguished from the high tensile stresses usually developed by cold working and it is an object of this invention to provide a new and improved method and apparatus for producing same.

These and other objects and advantages of this invention will hereinafter appear and for purposes of illustration, but not of limitation, reference may be had to the accompanying drawings in which—

FIGURE 3 is a graph comparing warpage with the bearing angle of steels drawn through a die embodying features of this invention;

FIGURES 4-17 are graphs comparing warpage with percent reduction in cross-sectional areas of steels drawn through dies embodying features of this invention having different bearing angles;

FIGURE 18 is a graph showing the longitudinal stress distribution in steel drawn through a conventional die;

FIGURE 19 is a graph showing the distribution of stored energy in a steel drawn through a conventional die and through a die embodying features of this invention; and FIGURE 20 is a curve showing percent reduction at which stress reversal no longer has any effect at various bearing angles.

For purposes of discussion herein of the distribution and intensity of residual stresses in steel, reference will be made to the warpage values of the steels since the warpage test represents a rapid, economical and fairly accurate method of obtaining gross measurements of the distribution and intensity of the residual stresses for evaluating the characteristics of the steels. Warpage, it is believed, is primarily influenced by the longitudinal stresses in the steel.

The warpage test by which the data referred to herein has been secured consists of cutting a slot through the bar diameter for a specified length. As the metal is removed in forming the slot, the bar ends remain free to move to some position that establishes a balanced condition between the residual stresses that remain in the bar halves. The bar end is measured before and after the saw cut so that the total movement of the ends, or flare, may be determined to 0.001". If movement of the ends is outwardly in the direction away from each other, the flare is tensile (plus), that is, it is formed because of the dominance of tensile stresses in the bar halves. If the ends move inwardly, the bar is compressive (minus). Compressive values often require more than one saw cut so that movement is not limited by anything other than the stresses involved. Warpage values in percent are computed from the following formula:

Warpage value percent=

$$\frac{\text{original diameter} \times \text{flare} \times 100}{\text{length of slot}^2}$$

Experimental variation limits the accuracy of the warpage number to ±0.066.

It has been found, in accordance with the practice of this invention, that the amount of stored strain energy and that the distribution, sign and intensity of residual stresses developed in steel during plastic deformation to effect reduction in cross-sectional area can be effectively controlled by the use of a draw die, the bearing portion of which is formed with a taper, the length of which depends for its minimum on the bearing angle. It has been found that for a given steel, the character of the residual stresses developed and the level of the residual stresses in the steel will depend greatly on the angle and the taper in the bearing portion of the die and that this geometric relationship may vary slightly for steels of one chemistry to steels of different chemistries, but that the same pattern of control exists substantially throughout with such materials as usually strain harden as a result of plastic deformation.

Figure 1:
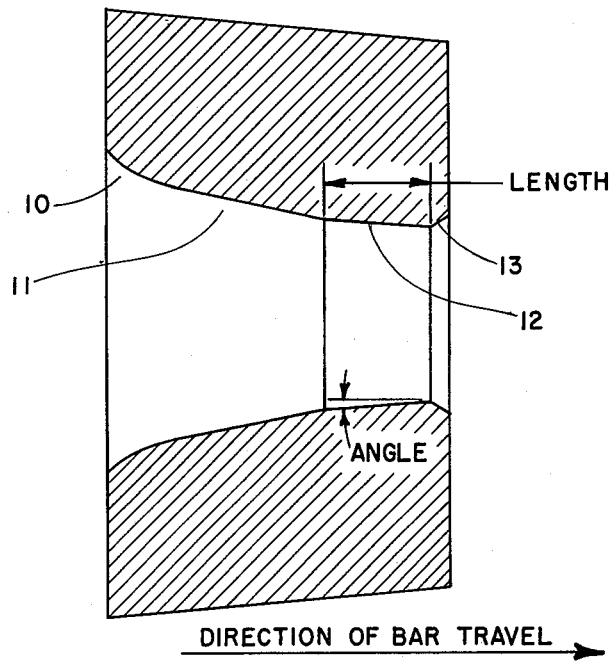
FIGURE 1 is a schematic sectional elevational view of a draw die embodying the features of this invention.

A draw die embodying features of this invention is illustrated in FIGURE 1. Referring to the portions of the die in the order engaged by a metal or bar travelling in the direction of the arrow through the draw die, 10 indicates the bell of the die, 11 the approach, 12 the bearing or exit portion and 13 the back relief wherein the approach and the bearing portion combine to provide the working section of the die.

In normal practice, the approach angle is rather substantial and it is during passage through this portion of the die wherein the major reduction in cross-sectional area of the steel is effected.

The bearing section of the die is employed in conventional practice primarily to finish the surface and size the final steel product. For this purpose it has been the practice to form the bearing with as straight a section as it is possible to achieve. In no instance are we aware of any attempt to control the geometry of the bearing so as to control or modify the residual stresses existing in the steel. Because of the limitations in the methods and materials used for producing dies, a parallel bearing with straight sides is difficult to form. Instead, the bearings formed in conventional dies often vary erratically over their entire length in the sense that an arc is usually formed.

Figure 2:
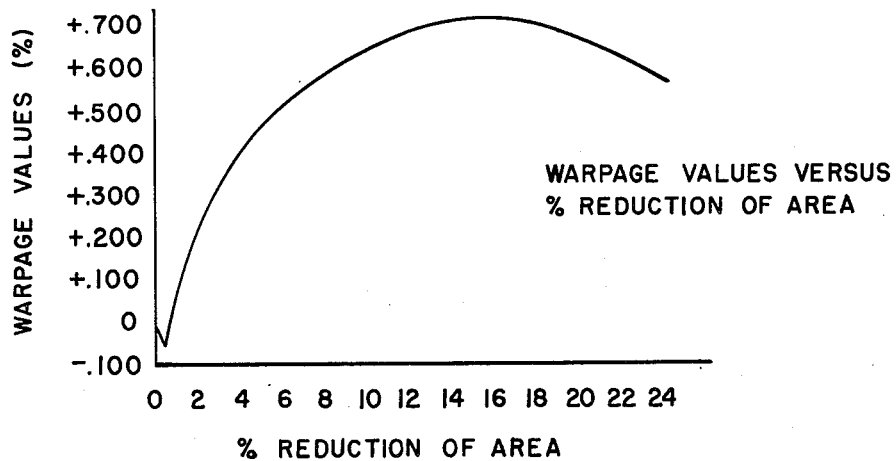
FIGURE 2 is a graph comparing warpage to percent reduction of steels drawn through a conventional die.
Figure 11:
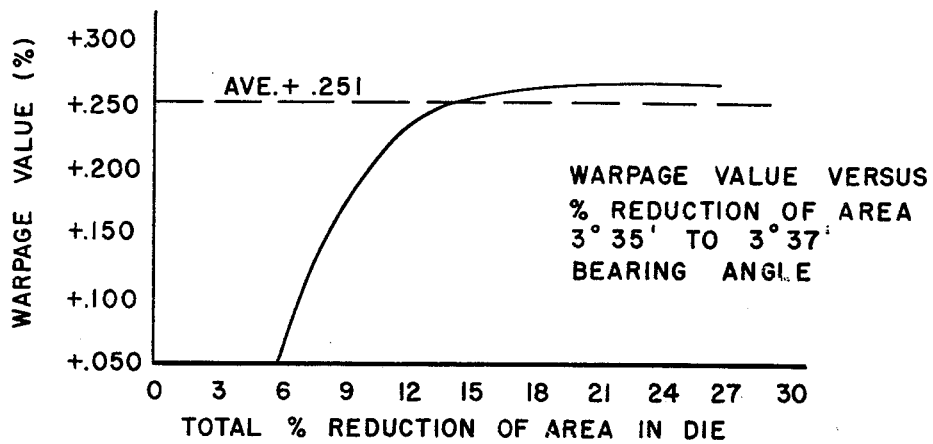
Figure 12:
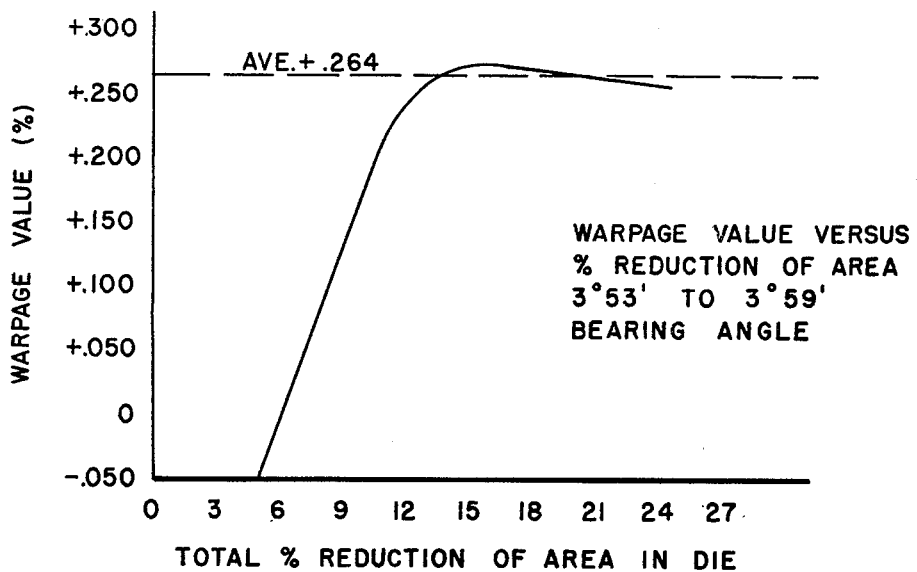
Figure 13:
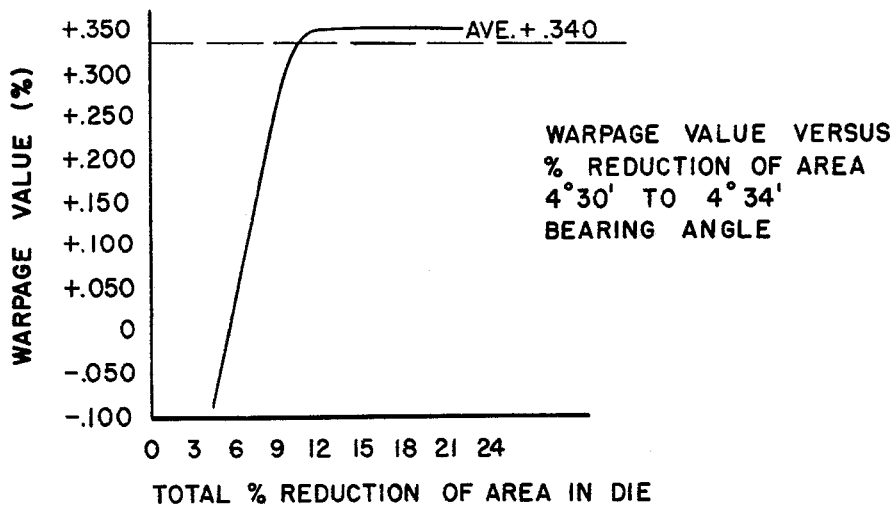
Figure 14:
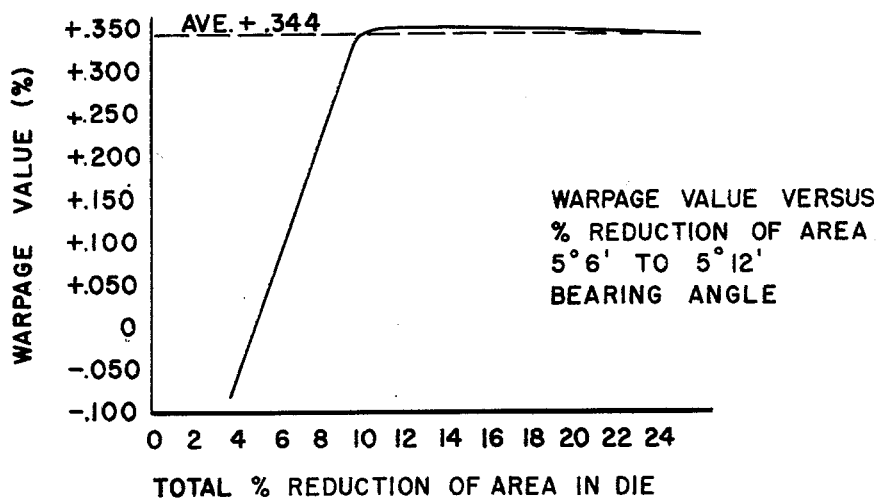

From FIGURE 2, which compares the warpage values as against percent reduction in cross-sectional area of a typical steel drawn through a conventional die, it will be apparent that the amount of warpage bears a direct relationship to the percent reduction in cross-sectional area. FIGURE 18 illustrates the distribution of stresses in a typical steel drawn through a conventional die to effect about a 21 percent reduction in cross-sectional area. This curve indicates the presence of high tensile stresses in the outer portions of the steel and high compressive stresses at the center.

Unlike the construction and operation of draw dies heretofore employed, dies formed with a tapered bearing in accordance with the practice of this invention make use of the bearing portion to control the stress characteristics of the steel such as the distribution and magnitude of the residual stresses and the stored strain energy. Whereas there is no intention in present practice to change the stress values existing in steel during passage of the steel through the bearing section of a conventional die, the bearing area of a draw die embodying features of this invention function to modify the stress characteristics of the steel to such an extent as to control the stresses and the levels thereof substantially independently of the previous history of the steel or the stress characteristics introduced while taking the major reduction during passage through the previous sections of the die and in which such final stress characteristics are controlled by the geometry of the bearing section and the length thereof.

It will be apparent from the figures hereinafter referred to that the percent reduction in cross-sectional area of the steel during passage through the tapered bearing portion will have little influence on the character of the residual stresses over a broad range of bearing angles and percent reductions, best depicted in FIGURE 20, where all reductions and bearing angles which intersect above the curve give warpage values that are independent of percent reduction. Those bearing angles and percent reduction lines which intersect below the curve are somewhat dependent upon percent reduction and the warpage values produced can be controlled. FIGURE 3 illustrates the effect of the bearing angle on the stress characteristics of the steel drawn through the draw die. From this graph it will be apparent that compressive stresses illustrated by negative warpage results in the processing of a 44 percent carbon steel, employed in the development of the data, between bearing angles of about 0°30' and 1°30', for example, and that the tensile stresses of the steel increase gradually from the use of bearings having greater angles in the draw die.

Graphs 4-17 relate the warpage value to percent reduction in cross-sectional area with different dies having bearing angles from about 0°2½' up to about 9°. It will be apparent from the data represeneted by these figures that with bearing angles less than about 0°17', the stress values as represented by warpage are somewhat uncontrollable. This is believed to result chiefly from the inability accurately to control the formation of a die with such a critical geometry.

Another important concept of this invention resides in the ability to control the character and the intensity or level of the residual stresses formed in steel by selection of a predetermined taper in the portion of the die from which the metal emerges in a drawing or working operation such as from the bearing portion of a draw die. It will be apparent from FIGURES 4-17 that for a steel of the type described, substantially zero warpage values will be secured in steels drawn through a die having a bearing angle within the range of about 0°15' to 0°25' plus or minus a few minutes either way as illustrated by FIGURE 5 showing the warpage values of steel drawn through a die having a bearing angle ranging between 0°17′ to 0°22′. With slightly greater bearing angles within the range of about 0°30′ to about 1°30′, steels may be formed which embody compressive stresses in the surface portions thereof sufficient to give negative warpage values as illustrated in FIGURE 6 showing negative warpage values for steel drawn through a die having a bearing angle of 0°58′ to 1°9′. It is believed that the development of compressive stresses in the surface portions of steels to provide negative warpage values represents the first time that compressive stresses capable of such development of negative warpage values have been successfully formed in steel, in connection with and as a product of a drawing operation which heretofore has invariably resulted in strain hardening and high positive warpage values in the drawn steel.

The critical point of reversal from negative warpage values through zero to positive warpage values occurs at greater percent reductions as the bearing angle of the die increases, as illustrated by FIGURE 20.

It is to be expected that the relationship between the residual stresses with respect to warpage values and bearing angle of the die will change slightly from one steel composition to another or from one metal to another or from one plastic or glass to another but the general pattern has been found to be the same. To determine the bearing angle for the development of the desired warpage values, it becomes only necessary to draw the particular material through a series of dies having different bearing angles to develop a curve of the type illustrated by FIGURE 3. Once the relationship has been established for steels of a particular chemistry, it becomes necessary thereafter only to determine the residual stress characteristics desired in the final product and then select the die having the bearing angle capable of providing those characteristics and the development thereof will be secured in the final product substantially independently of the diameter or the cross-section of the steel.

Thus by varying the bearing angle or the taper in that section of the draw die preceding the exit end, it has become possible to control the usual residual stress distribution in the steel to produce steels having different warpage values. One example, illustrated in FIGURE 3, shows a spread of from minus .200 percent to plus .700 percent.

For example, in round steel bars, as previously pointed out, once the bearing angle has been determined, the minimum length of the bearing can be calculated as that length which provides for effective plastic deformation across the piece. The length limitation defined constitutes a minimum length of the bearing for effective warpage control. Once effective deformation has been secured, continued deformation in the same angle in a bearing of greater length will result in little, if any, modification in the stress distribution and warpage values of the steel thereby to enable variation in percent reduction beyond a calculated minimum for every bearing angle. In general, the bearing length is related to the cross-sectional dimension of the metal and the bearing angle. For a draw die having a bearing angle of 0°36′, the minimum length of the bearing can be computed from the formula $L=0.5D$ for the 1144 steel which was used in the development of the illustrated data, where L is length and D is finished diameter. The composition of 1144 steel will hereinafter be set forth.

With bearings having an angle within the range described for practice of this invention, the following equation can be used to determine the minimum length of the tapered bearing portion of the die:

$$L = \tfrac{1}{2} D$$

wherein L is the length of the tapered bearing portion and D is the finished diameter or cross section. The above equation is somewhat independent of bearing angles when the length of the tapered bearing portion is at least ¼ inch.

The information illustrated in FIGURES 4–17 was secured by drawing bars of various dimensions through each die to obtain the different percent reductions for each bearing angle. Each figure represents the data secured with a die having a different taper in the bearing and the maximum and minimum taper for each bearing is indicated by the bearing angle range for each die.

As previously pointed out, the effect of chemistry on the deformed piece has some influence on the bearing angle employed to secure the desired distribution and intensity of residual stresses although the angles for one material will be of substantially the same order as for others. In general, however, all open hearth steels reflect similar warpage characteristics regardless of chemical content or percentage reduction through the tapered bearing die. Bessemer steels are similarly consistent but have a different warpage characteristic than the open hearth steels.

In addition to modification of the distribution and intensity of the residual stresses in steel, control of the stored strain energy of steel is markedly influenced by the use of a draw die having a tapered bearing. The profound effect of a tapered bearing embodying features of this invention on the stored strain energy in the steel is illustrated in FIGURE 19 which relates the values of stored strain energy from a 22 percent reduction in steel by the use of a conventional die having a straight bearing to the values of stored strain energy in the same steel given a similar reduction through a die having a 0°35′ taper in the bearing. It will be apparent from these results that the stored strain energy in steel is markedly reduced by drawing to effect an equivalent reduction through a tapered die embodying features of this invention as compared to a conventional die having a nominally straight bearing and it will be apparent also that the distribution of the stored strain energy is uniform throughout the cross-section of the steel when drawn through a tapered bearing die as distinguished from the more intensified and wide variation in stored strain energy in steels drawn through a conventional die with the same reduction and with the same material.

The mechanism of the reactions which result in the development of residual stress characteristics differing entirely by the use of a tapered bearing die as compared to a conventional die are not capable of positive identification. It is believed, however, that by appropriate control of the taper in that section of the die immediately preceding the exit end and by control of the length of the taper, it becomes possible to control distribution of deformation of the metal so that a minimum of stress is set up between lattices and adjacent crystals. By controlling the taper and the length of the tapered bearing, it is possible to produce more or less distortion and thereby control the intensity distribution and direction of the residual stresses in the steel and also to control the level of the stored strain energy.

By the use of a tapered bearing die embodying features of this invention, it becomes possible to produce a metal having minimum warpage and also to provide steels having superior machining characteristics and formability as well as improved wear and corrosion resistance. Further improvements in the characteristics of the steels will result from the production of bars, rods, tubes and the like having low stored strain energy and with compressive stresses on the surfaces thereof thereby markedly to reduce cracking while increasing the strength of the product, for example to produce products of the type secured by the Landis Patent No. 2,320,040. These advantages coupled with improvements in characteristics secured by the processing of steels by drawing at elevated temperatures, such as within the temperature range of 250–850° F. for the improvement of mechanical properties and between 850° F. to slightly below the lower critical temperature for the steel to improve the stress characteristics, as described in the copending applications Ser. No.

518,411, Ser. No. 518,412, Ser. No. 518,413 and Ser. No. 518,414, now Patents No. 2,767,837, No. 2,767,835, No. 2,767,836 and No. 2,767,838, respectively, which are continuations of applications Serial Nos. 293,431, 293,432 and 293,433 now abandoned, are believed to enable the production of steels having presently unavailable characteristics with respect to strength, strain, warpage, hardness, machinability and stored strain energy.

Mechanical properties such as the proportional limit and yield strength may be effected by appropriate residual stress control. We have discovered that higher proportional limits may be produced in cold deformed bars than is normally the case during cold deformation. Also we have discovered that a stress strain curve taken on such material produced, embodying this new practice, exhibits a close approach to a sharp yield point, indeed closely approximating the curve normally obtained in non-deformed material.

In general, the inventive concepts described herein can be employed in the field of metallurgy and related subjects to the production of materials having desired levels, sign and distribution of stresses resulting in improved fatigue life, wear, corrosion resistance, straightening, machinability and resistance to cracking, without the need for employing additional treatments in conjunction with or in addition to the drawing operation to bring about such changes. Production can also be secured of steels having low stored strain energy further to benefit the properties of fatigue, wear, corrosion and cracking of the metal.

From present indications, these same concepts are applicable to other methods for working, such as cold extrusion, rolling, stamping swaging and the like, and to other materials which upon working in the manner described tend to strain harden, such as aluminum alloys, iron base alloys, copper base alloys, titanium base alloys, special high temperature alloys, special glasses, plastics and the like. The concepts of the invention are applicable to the working of metals and the like having different shapes such as tubing, pipe, rods, wire bars and the like of different cross-section.

The following table illustrates the development of the concepts described by working steel other than by the process of drawing. The data contained in the table represents the results secured with 1144 steel bars of ⅞ inch in diameter pushed in one instance and drawn in another instance through a conventional die and a tapered bearing die embodying the features of this invention having a 0°24′ bearing angle.

| Die Type | Percent reduction | Direction of work load | Warpage |
|---|---|---|---|
| Conventional | 11.1 | Extruded | +.538 |
| Tapered bearing | 11.2 | do | −.289 |
| Conventional | 11.1 | Drawn | +.681 |
| Tapered bearing | 11.2 | do | −.165 |

It will be apparent from the above that the differences in warpage resulting from drawing a bar of the same chemistry through a tapered bearing die as distinguished from a conventional die to effect a similar reduction in cross-sectional area is available also on the same order by extrusion of the same steel to effect a similar reduction in area through a conventional die as compared to a tapered die embodying the concepts described and claimed herein.

By way of further illustration of the application of the inventive concepts to other materials of the type described, the following lists a number of metals which have been processed in the manner described to effect a similar reduction of 20 percent in cross-sectional area by drawing through a conventional die and a tapered bearing die having a bearing angle of about 0°30′.

| Material | Warpage | |
|---|---|---|
|  | Conventional Die | 0°30′ Tapered Bearing die |
| 1144 steel | +.611 | −.066 |
| 1010 steel | +.344 | +.085 |
| 1018 steel | +.411 | −.027 |
| 1035 steel | +.533 | −.115 |
| 1050 steel | +.483 | −.095 |
| 1084 steel | +.703 | −.087 |
| 18-8 stainless | +.720 | +.071 |
| Molybdenum vanadium tool steel | +.543 | −.118 |
| Aluminum | +.244 | +0.044 |

The following are the compositions of the above materials:

| | C | Mn | Phos. | S | Si | Mo | Va | Cr | Ni | W |
|---|---|---|---|---|---|---|---|---|---|---|
| 1144 | 0.40-0.48 | 1.35-1.65 | .045 max. | 0.24-0.33 | | | | | | |
| 1010 | 0.08-0.13 | 0.30-0.50 | .04 max. | .05 max. | | | | | | |
| 1018 | 0.15-0.20 | 0.60-0.90 | .04 max. | .05 max. | | | | | | |
| 1035 | 0.32-0.38 | 0.60-0.90 | .04 max. | .05 max. | | | | | | |
| 1050 | 0.48-0.55 | 0.60-0.90 | .04 max. | .05 max. | | | | | | |
| 1084 | 0.80-0.93 | 0.60-0.90 | .04 max. | .05 max. | | | | | | |
| 18-8 Stainless | 0.15 max. | 2.00 max. | | | 1.00 max. | | | 17.0-19.0 | 8.0-10.0 | |
| Molybdenum vanadium steel | .85 | | | | | 5.0 | 2.0 | 4.0 | | 6.00 |
| Aluminum | (.06 silicon, 0.16 iron) | | | | | | | | | |

It will be evident from the above that the residual stresses developed in each of the metals drawn to effect a reduction in cross-sectional area in a tapered bearing die is of an entirely different order than the stress characteristics, as indicated by the warpage values, of the same metals drawn through a conventional die to effect substantially the same amount of reduction. It will be significant also that as the carbon content of the steels increases the positive warpage value of the steels drawn through a conventional die also rises but that the warpage values of these same steels decrease and even provide negative warpage when drawn through a tapered bearing die. In every instance the warpage values are greatly decreased, indicating a considerably lower intensity of residual stresses in the bars drawn through the tapered bearing dies.

It will be understood that changes may be made in the details of construction, operation and in the materials employed without departing from the spirit of the invention, especially as defined in the following claims.

We claim:

1. In the plastic deformation and reduction in cross-sectional area of a material which strain hardens, the steps of taking a major reduction in the material independent of the rate of reduction and in a final reduction step following the major reduction, taking a reduction at a predetermined rate corresponding to the slope of the hypotenuse of a right triangle having an included angle of 0°17′ to 3°30′ for a minimum length to cause plastic deformation to penetrate through the cross-section of the material at the rate of reduction.

2. In the plastic deformation and reduction in cross-sectional area of a material which strain hardens comprising the steps of advancing the material through a die to take a major reduction in the cross-sectional area independent of the rate of reduction and then advancing the material through the die to take the final reduction following the major reduction at a rate corresponding to the slope of the hypotenuse of a right triangle having an included angle of 0°30' to 1°30' for a minimum length to cause plastic deformation to penetrate into the cross-section of the material.

3. In the method of effecting plastic deformation and reduction in cross-sectional area of a steel which strain hardens, the steps of advancing the steel through a draw die to take the major reduction in a first reduction step independent of the rate of reduction and then a minor reduction in a final reduction step at a rate corresponding to the slope of the hypotenuse of a right triangle having an included angle of 0°17' to 3°30' and having a length corresponding to the equation $L=\frac{1}{2}D$, wherein L is the minimum length of the die wherein the final reduction is taken and D is the finished diameter of the steel.

4. In the method of effecting plastic deformation and reduction in cross-sectional area of a steel which strain hardens, the steps of advancing the steel through a draw die to take the major reduction in a first reduction step independent of the rate of reduction and then a minor reduction in a final reduction step at a rate corresponding to the slope of the hypotenuse of a right triangle having an included angle of 0°30' to 1°30', and having a length corresponding to the equation $L=\frac{1}{2}D$, wherein L is the minimum length of the die wherein the final reduction is taken and D is the finished diameter of the steel.

References Cited in the file of this patent

UNITED STATES PATENTS 2,589,881   Sims et al. _____ Mar. 18, 1952

FOREIGN PATENTS 56,974   Netherlands _____ Sept. 15, 1944

OTHER REFERENCES

Brochure of Vascoloy Ranet Corp., North Chicago, Illinois, April 1941.